July 4, 1961

C. O. GLASGOW 2,990,691

LOW TEMPERATURE SEPARATOR

Filed Dec. 24, 1958

INVENTOR.
CLARENCE O. GLASGOW
BY
Arthur R Wade
ATTORNEY

July 4, 1961

C. O. GLASGOW 2,990,691

LOW TEMPERATURE SEPARATOR

Filed Dec. 24, 1958

INVENTOR.
CLARENCE O. GLASGOW
BY *Arthur L. Wade*
ATTORNEY

July 4, 1961

C. O. GLASGOW 2,990,691

LOW TEMPERATURE SEPARATOR

Filed Dec. 24, 1958

INVENTOR.
CLARENCE O. GLASGOW

BY *Arthur L Wade*

ATTORNEY

U̇nited States Patent Office 2,990,691
Patented July 4, 1961

2,990,691
LOW TEMPERATURE SEPARATOR
Clarence O. Glasgow, Tulsa, Okla., assignor to National Tank Company, Tulsa, Okla., a corporation of Nevada
Filed Dec. 24, 1958, Ser. No. 782,979
11 Claims. (Cl. 62—42)

This invention relates to well fluid separators. More specifically, the invention relates to low temperature separators wherein predominantly gaseous well streams of relatively high pressure are stripped of readily liquifiable hydrocarbons and water.

The present embodiment of the invention is useful where a so-called gas, or gas-oil well, is flowing at relatively high pressures and producing considerable quantities of gas along with various liquifiable hydrocarbons and water or water vapor. Wells vary widely as to their flowing pressure, temperature and the composition of their flow stream. It may be desirable to remove practically all the water and water vapor from the flow stream. It may be desirable to only reduce the dew point to a moderate figure and strip the flow stream as completely as possible of readily liquifiable hydrocarbons, or to allow a portion of such hydrocarbons to remain in the residual gas. Low temperature separation systems providing these functions generally include a vessel into which the well stream is choked to reduce its pressure in order for the water and hydrocarbons to liquefy in accordance with the Joules-Thompson effect. In general, it is common to maintain a collection of the liquids in the vessel, heated to a temperature which will melt the ice and/or hydrates formed when the well stream is cooled by pressure reduction.

It has been common to maintain the elevated temperature of the liquid bath of a low temperature separation vessel by heat transfer coils mounted directly in the liquid bath. These coils can be directly heated by circulating the well stream therethrough, steam or the products of a combustion process. These sources of heat, outside the vessel, have made the system physically bulky, expensive to fabricate and difficult to transport. Further, the constant threat of rupture of the heat exchange walls in the relatively high pressure of the vessel threatens loss of life and property.

A primary object of the present invention is to mount a source of heat within the vessel of a low temperature separation unit in such a way that the unit will be compact, inexpensively manufactured and safe to operate.

Another object of the invention is to mount a source of direct heat within the vessel of the low temperature separation system so its heat will be transmitted indirectly to the liquid bath of the vessel.

Another object of the invention is to supply heat for the liquid bath of a low temperature separator with a separate liquid which is directly heated within a closed system within the vessel.

Another object of the invention is to provide a closed system for a heated body of liquid in the bath of the low temperature separation vessel, the body of liquid being heated from a source of combustion also mounted within the vessel.

Another object is to provide a body of heating liquid circulating in a zone within the liquid bath of a low temperature separator vessel and heat exchanging with the choke for the well stream.

Another object is to dissipate the heat of a heating body of liquid to the liquid bath of a low temperature separator at multiple points with a conducting structure.

Another object is to divert the choked well stream of a low temperature separator vessel downwardly toward its liquid bath while insulating the stream from the radiated heat of a heating source for the bath and then reversing direction of flow of the cooled gaseous portion of the well stream upwardly into heat exchange with the heating source, whereby the gaseous portion acquires sufficient heat to eliminate any hydrates in the path of the gaseous portion to its outlet from the vessel.

The present invention contemplates mounting a completely contained source of heat within the interior of the vessel of a low temperature separation system for predominantly gaseous well streams to provide a compact, inexpensive unit which can be readily transported.

The invention further contemplates the combustion of a fuel within a chamber mounted in the vessel of a low temperature separation system. The heat of the combustion chamber is transmitted to the bath through a heat transfer medium for mechanically isolating the walls of the high pressure vessel from the walls of the combustion chamber. The invention further contemplates the heating zone of the combustion chamber and heat transfer medium extending centrally through the vessel of the low temperature separation system to make the unit compact and readily available for service and instrumentation. The invention further contemplates a transfer medium of liquid circulating in a chamber mounted within the liquid bath of the vessel of the low temperature separation system. A fuel-fired combustion chamber is mounted within the heating liquid chamber. A heating liquid is selected which will not freeze at expected ambient temperatures during intermittent operation of the system.

The invention further contemplates that the heating liquid circulating through the bath of the vessel be passed through a conduit external of the vessel and into heat exchange with the choke across which the pressure of the well stream is reduced into the vessel.

The invention further contemplates the chamber for the heating liquid mounted in the bath of the vessel of the low temperature separation system having fins mounted thereon and extending into the liquid bath in order to dissipate the heat of the liquid into the liquid bath at multiple points.

The invention further contemplates a baffle structure between the choke inlet to the vessel and the chamber for the heating liquid which will divert the well stream downwardly toward the bath and insulate the downwardly-diverted stream from heat radiating from the heating liquid chamber. The baffle then directs reversal of the cooled gaseous portion of the well stream in order to discharge ice and hydrates into the liquid bath from the gaseous portion and to pass the remaining gaseous portion of the well stream into heat exchange relation with the heating liquid chamber prior to the gaseous portion of the well stream passing from the vessel, whereby the gaseous portion acquires sufficient heat to eliminate any hydrates in the path of the gaseous portion of the well stream to its outlet from the vessel.

Other objects, advantages and features of this invention will become apparent to one skilled in the art upon consideration of the written specification, appended claims and attached drawing wherein:

Figure 1:
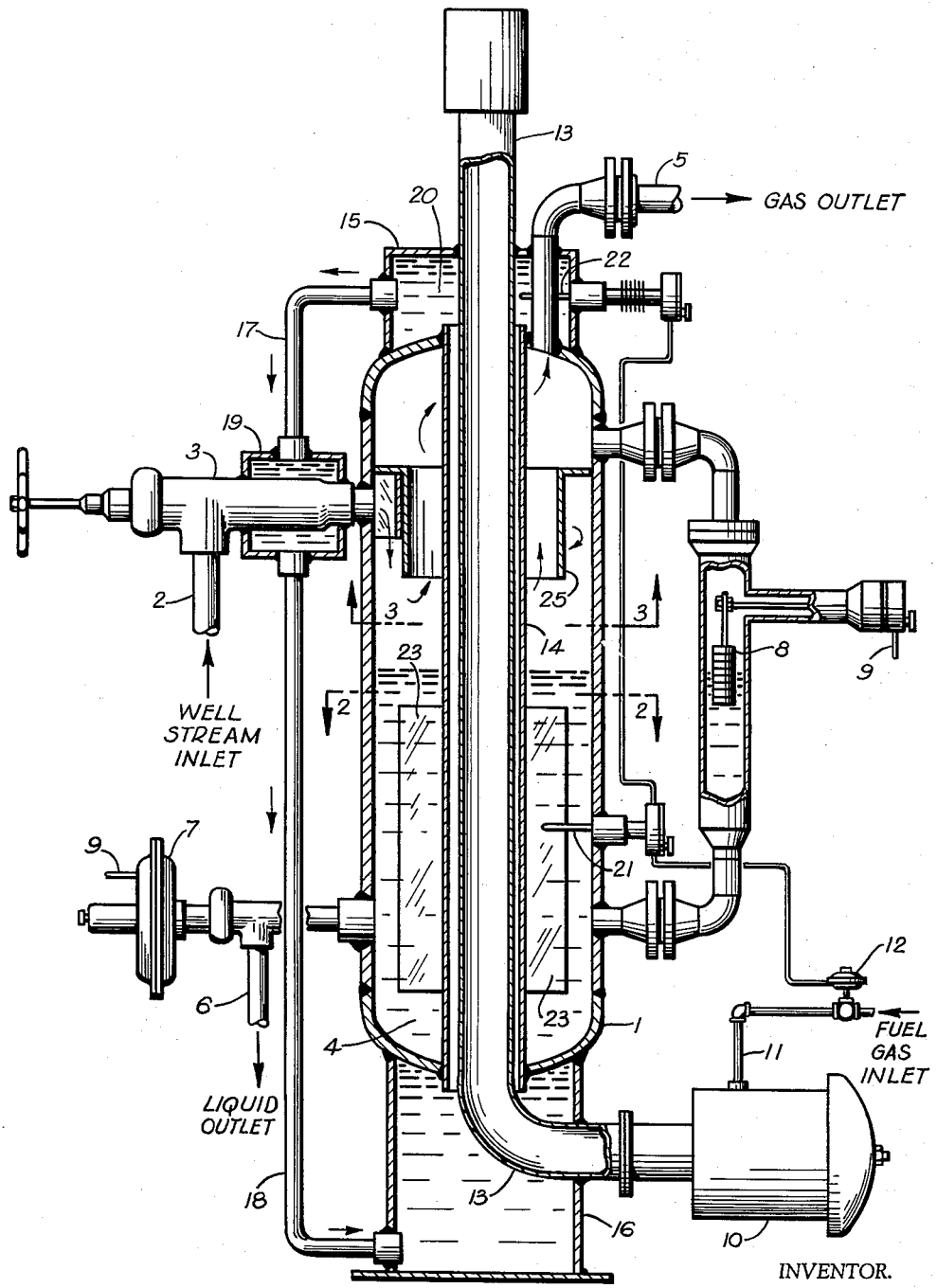
FIG. 1 is a sectioned elevation of the preferred embodiment of the invention in a vertical low temperature separation vessel.

FIG. 1 illustrates the essential structure associated with the vessel of a low temperature separation system, the combination embodying the present invention. The vessel shell 1 is cylindrical and is mounted with its longitudinal axis vertical. The well stream is brought to vessel 1 by conduit 2. The high pressure of the well stream, generally ranging from 1500 lbs. per sq. inch upward, is reduced through a conventional choke 3.

The reduction in pressure of the well stream, through choke 3, lowers the temperature in accordance with the Joules-Thompson effect. The cooling condenses, or liquifies, both hydrocarbons and water of the well stream. These liquids collect in a bath 4. The remaining gaseous phase of the well stream is drawn off the vessel 1 through conduit 5. The gas of conduit 5 is the primary product of the system, being dehydrated in this manner and at a pressure which will be accepted into a pipe line.

Hydrates that form when the well stream has its pressure reduced are a common hazard. These products will physically block, or clog, the gas space within vessel 1. A common practice is to heat bath 4 to a temperature which will melt hydrates as these hydrates precipitate into the bath as they form.

Bath 4 can be separated into its water and hydrocarbon components and the components separately withdrawn. In FIG. 1 all liquids of bath 4 are withdrawn through conduit 6. Valve 7 in conduit 6 regulates the liquid withdrawal from bath 4. Valve 7 is controlled by float 8 which develops a fluid pressure in pipe 9. Pipe 9 is now shown connected to the diaphragm of valve 7 to avoid drawing complications.

The temperature of bath 4 is controlled by a temperature sensing element which regulates heat input to the bath. The arrangement of the heat source within the vessel, under the concepts of the invention, gives a physically compact system, yet one that can be inexpensively manufactured and is safe to operate.

FIG. 1 illustrates the source of heat as a firetube exposed directly to the combustion of fuel gas. Details of the flame arrestor, fuel-air mixer and burner are not illustrated. These elements are contained within housing 10. Fuel gas is brought to housing 10 by conduit 11. Valve 12 regulates the flow of fuel gas through conduit 11. Valve 12 is controlled by a temperature sensing system which will be described subsequently.

The products of combustion of fuel gas from conduit 11 are passed through firetube 13. Tube 13, fired from housing 10, is arranged substantially completely within vessel 1. The combination of low temperature separation vessel and heat source is very compact when compared with externally placed heat sources. Further the mounting of this direct source of heat, so its heat will be transmitted to bath 4 indirectly, offers further advantages under concepts of the invention.

A closed system of liquid heat transfer medium is combined with vessel 1 and firetube 3. A conduit 14 is mounted in the vessel 1 about its vertically extended longitudinal axis. Conduit 14 opens into reservoir compartments at the top and bottom of the vessel 1. Conduits 17 and 18 extend from these reservoir compartments to a jacket 19, about choke 3, to complete the closed system. This closed system may be filled with any material 20 which will not freeze in cold weather and yet will function to transfer the heat of tube 13 to the liquid bath 4 and parts of vessel 1 on which hydrates might stick and collect. Glycol is one satisfactory medium for this purpose.

As the heat of tube 13 is transmitted to glycol 20, the glycol will circulate under the force of thermosyphon action. Arrows are used to indicate the direction of glycol movement. In this path the glycol body 20 becomes a heat source for bath 4, gas in the upper part of vessel 1 and the choke 3. Thus hydrate formation is eliminated, and prevented, at multiple locations throughout the system.

The combination of direct heat source tube 13 and heated body of liquid between the tube and interior of vessel 1, but both within the vessel 1, has several advantages. The compactness of the arrangement has been discussed. Further, the danger of vessel 1 being ruptured, and the relatively high pressure within vessel 1 escaping, is reduced. Tube 13 may fail from direct exposure to the fuel gas flame, but rupture of these walls in this combination would only release the liquid body 20, leaving the vessel 1 intact. Obviously the danger to operating personnel and equipment is less than in arrangements where there is direct exposure of the vessel 1 interior to the combustion.

It can now be seen that an objective of the combination is to maintain a temperature differential between bath 4 and glycol 20. To maintain this differential, temperature response element 21 is placed in bath 4 and element 22 is placed in glycol 20. The fluid pressure control signals developed by these elements are compared and their difference applied to the control of valve 12. It is not seen as necessary to disclose this system in greater detail. By this system the heat input to the vessel 1 is regulated to effectively eliminate and prevent hydrate formation in the vessel 1 or choke 3.

The heat of glycol body 20, transmitted through the walls of conduit 14, is dissipated in bath 4 by a fin structure. A series of metallic plates, as fins, are spaced about conduit 14. These fins 23 are attached directly to the walls of conduit 14 and dissipate, by conduction, the heat of liquid 20 into the liquid bath 4 at multiple locations. The efficiency gained by this dissipating means is a new result in these combinations of low temperature separator vessels and heat sources for their baths.

Figure 2:
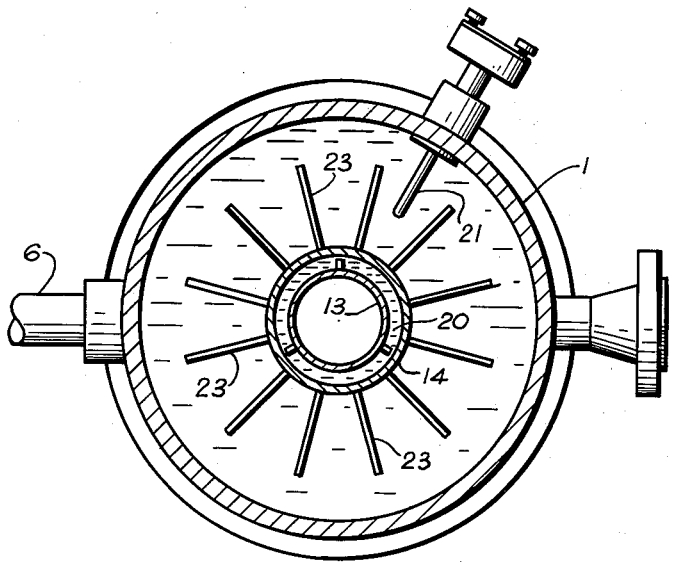
FIG. 2 is a plan view of a cross-section taken along lines 2—2 of FIG. 1.

FIG. 2 shows the fins 23, conduit 14, tube 13 combination within vessel 1 to further advantage. The compactness and simplicity of the arrangement is obvious from FIG. 2 and the result is a distinct advance in the art of low temperature separation.

Figure 3:
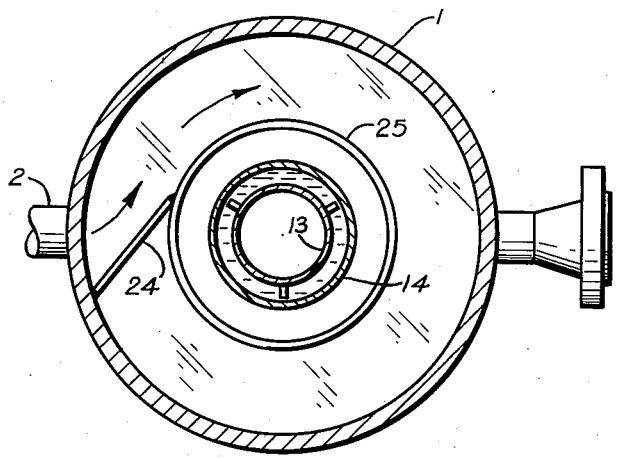
FIG. 3 is a plan view of a cross-section taken along lines 3—3 of FIG. 1.

FIG. 3 is to be taken in connection with FIG. 1 to show the flow path of the well stream from conduit 2 to further advantage. The well stream of conduit 2, out of choke 3 strikes diverter plate 24 and is whirled in a circular path about the interior of vessel 1. FIG. 3 shows the circular path and FIG. 1 indicates the downward course, followed by a sharp reversal upward, of the path, toward outlet conduit 5.

Baffle structure 25 performs several functions. First, the baffle 25 enters into the definition of the circular flow path of the well stream around the interior wall of vessel 1. Second, the baffle insulates the downwardly directed well stream from the heat of conduit 14 so the full effect of the pressure-reduction cooling is more efficient in dehydrating the well stream. Third, the baffle defines a flow path for the well stream as it is sharply diverted upward from the surface of bath 4. The sharp change in direction throws the liquefied components, and hydrates, into bath 4. The remaining gas is then flowed over the external surface of conduit 14 to be warmed so hydrates will not form, and those already entrained in the gas will be melted.

Figure 4:
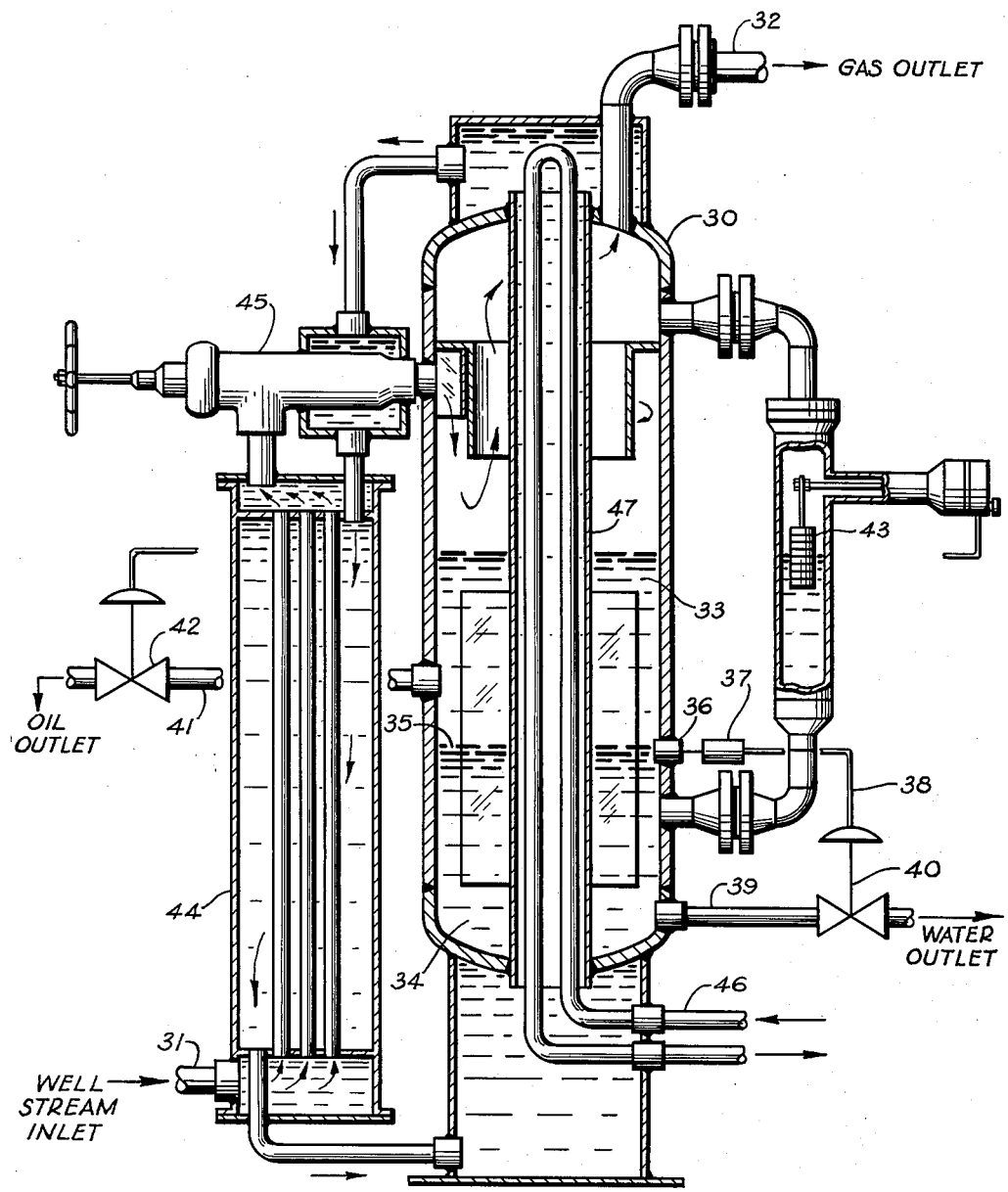
FIG. 4 is a sectioned elevation of a low temperature separation vessel similar to FIG. 1 with a different type of heat source and control of the liquid phases of the well stream.

FIG. 4 has been established to elaborate on the concepts of the invention illustrated in FIG. 1. A low temperature separation vessel 30 is shown, generally similar to vessel 1 of FIG. 1. A well stream is brought to the vessel by conduit 31 and dehydrated gas is removed through conduit 32.

In FIG. 1 it was illustrated that all liquids could be removed through a single conduit. FIG. 4 now illustrates how the liquid may be permitted to separate into its oil and water contents and these separately removed. The liquid bath is shown as comprised of oil strata 33 on top of a water strata 34. The interface between these two liquids is shown as maintained at 35. One means of detecting this interface 35 is indicated as embodied in a probe 36 with which a fluid pressure control signal is developed through a system in an instrument at 37.

The probe 36 may be a capacitance type incorporated in a circuit, as shown in Gunst et al. 2,720,624, within instrument 37. The transduction of the probe signal into a control fluid pressure in pipe 38 is well within the skill of those practicing the control art. The water drawn from body 34, through conduit 39 is controlled by valve 40. Valve 40 is regulated by the signal in pipe 38 to maintain interface 35 at a fixed spatial relationship with probe 36.

Oil from body 33 is drawn from vessel 1 through conduit 41. Valve 42 controls the withdrawal of oil and is regulated by float 43 as illustrated in FIG. 1.

FIG. 4 illustrates a closed system of circulating heat exchange liquid very similar to that illustrated in FIG. 1. Additionally, this circuit is illustrated as incorporating a heat exchanger 44 with which the well stream through conduit 31 is warmed a desirable amount prior to passing through choke 45. Thus, is illustrated the further flexibility of this closed system of heat exchange medium for applying heat to multiple locations throughout a low temperature separation system.

Another feature illustrated by FIG. 4 is that of direct heating of the heat exchange medium with other heat sources than the gas fired tube illustrated in FIG. 1. If available, it is well within the scope of the invention to include a conduit 46 within tube 47 to introduce heat into the heat exchange medium.

Conduit 46 may be coils circulating steam from a source not illustrated. Other forms of such heat exchangers are conceivable, and their combination with a body of heat exchange medium for indirectly transmitting heat to a low temperature separation system falls within the scope of the present invention.

Figure 5:
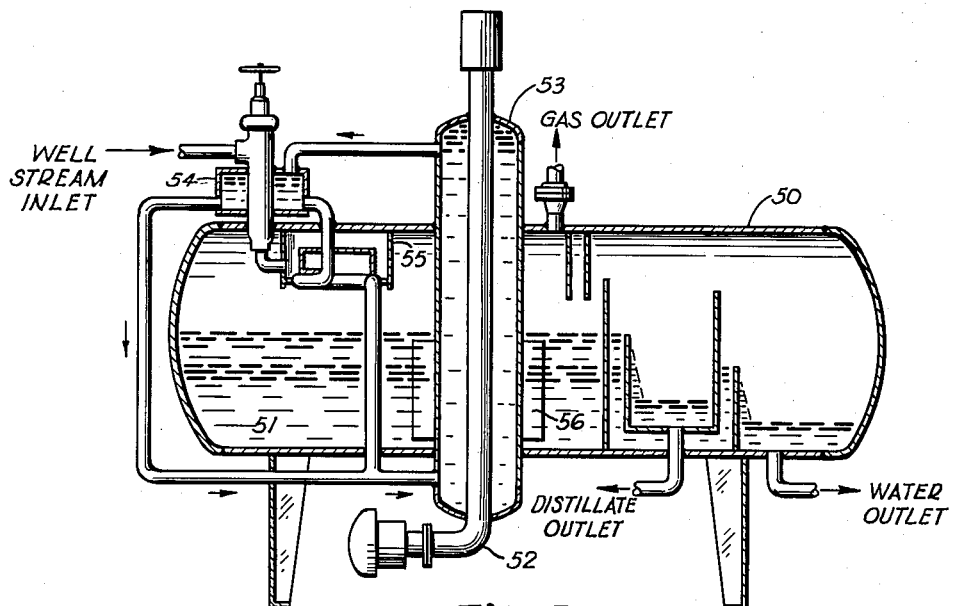
FIG. 5 is a sectioned elevation of a horizontal low temperature separation vessel embodying certain features of the invention.
Figure 6:
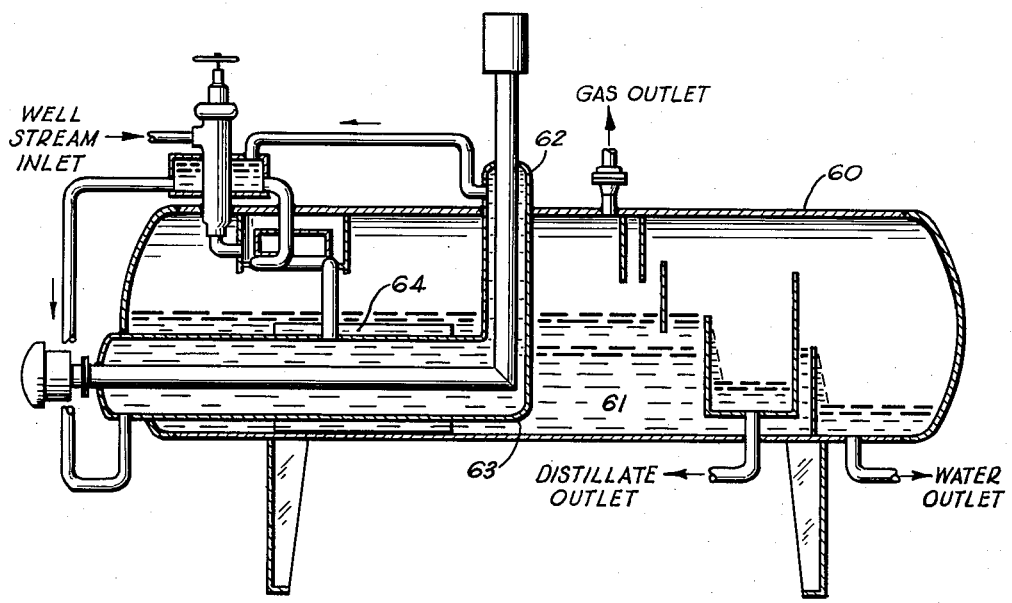
FIG. 6 is a sectioned elevation of a horizontal low temperature separation vessel similar to that of FIG. 5 and having a different arrangement of the heat source.

FIGS. 5 and 6 should be taken together in disclosing the further flexibility of the invention. These figures illustrate low temperature separation vessels with their longitudinal axes horizontally extended. Low temperature systems including similar vessels are illustrated in Walker et al. 2,747,002. The structure embodying the concepts of the invention is readily combined with these horizontal vessels.

The sole difference between the vessels of FIGS. 5 and 6 are their lengths. The form of the novel structure combined with the FIG. 5 vessel operates with somewhat greater efficiency with a bath of shorter longitudinal dimension than the bath of FIG. 6.

FIG. 5 illustrates a low temperature separator vessel 50 with a liquid bath 51 maintained therein. Firetube 52 is illustrated extending vertically up through vessel 50 and its bath 51. Jacket shell 53 is arranged about firetube 52 and contains the liquid heat exchange medium which transmits heat of the products of combustion of tube 52 to bath 51, and other locations in the low temperature separator system.

The liquid heat exchange medium is thermosyphonically circulated from the top of jacket-shell 53 through a system of conduits heat exchanging with choke jacket 54 and spinner-baffle 55. Additionally, fins 56 dissipate the heat of the heat exchange medium through multiple locations in the bath 51.

FIG. 6 shows an elongated low temperature separation vessel 60, horizontally extended with a liquid-bath 61 maintained therein. Firetube 62, in contrast to the arrangement of FIG. 5, is shown horizontally extended in bath 51 for a substantial portion of its length and then taken from the top of vessel 60. Jacket shell 63 is arranged about firetube 62 to contain the liquid heat exchange medium. The longitudinally extended arrangement of jacket shell 63, with heat-dissipating fins 64, will more efficiently distribute heat to bath 61 than the FIG. 5 arrangement.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A low temperature separation system for high pressure hydrocarbon well streams including, a high pressure vessel receiving the well stream, a choke through which the well stream is received into the high pressure vessel and reduced in pressure to condense the preponderant part of the hydrocarbons and dehydrate the gaseous portion of the well stream, a liquid bath in the high pressure vessel arranged to receive hydrates directly therein as the hydrates are formed when the pressure of the well stream is reduced, an outlet for the dehydrated gas above the level of the liquid bath, and a source of heat mounted in the vessel and arranged in the liquid bath to maintain the bath at a temperature which will melt the hydrates received therein, and the source also extending substantially through the length of the gas flow path to the outlet so as to prevent hydrates from forming an obstruction to the gas flow at the outlet.

2. A low temperature separation system for high pressure hydrocarbon well streams including, a high pressure vessel receiving the well stream, a choke through which the well stream is received into the high pressure vessel and reduced in pressure to condense the preponderant part of the hydrocarbons and dehydrate the gaseous portion of the well stream, a liquid bath in the high pressure vessel arranged to receive hydrates directly therein as the hydrates are formed when the pressure of the well stream is reduced, an outlet for the dehydrated gas above the level of the liquid bath, and a source of heat mounted in the vessel and arranged in the liquid bath to maintain the bath at a temperature which will melt the hydrates received therein, and the source also extending substantially through the length of the gas flow path to the outlet so as to prevent hydrates from forming an obstruction to the gas flow at the outlet comprising, a direct source of heat operated at low pressure, and a chamber of heat exchange liquid about the low pressure source of heat and in heat exchange contact with the liquid bath and with the gas flowing to the outlet.

3. A low temperature separation system for high pressure hydrocarbon well streams including;

a high pressure vessel receiving the well stream;

a choke through which the well stream is received into the high pressure vessel and reduced in pressure to condense the preponderant part of the hydrocarbons and dehydrate the gaseous portion of the well stream;

a liquid bath in the high pressure vessel arranged to receive hydrates directly therein as the hydrates are formed when the pressure of the well stream is reduced;

an outlet for the dehydrated gas above the level of the liquid bath;

and a source of heat mounted in the vessel and arranged in the liquid bath to maintain the bath at a temperature which will melt the hydrates received therein, and the source also extending substantially through the length of the gas flow path to the outlet so as to prevent hydrates from forming an obstruction to the gas flow at the outlet comprising, a direct source of heat operated at low pressure, and a chamber of heat exchange liquid about the low pressure source of heat and in heat exchange contact with the liquid bath and with the gas flowing to the outlet;

and a conduit connected to the chamber of heat exchange liquid at two points to provide a circuit for the heat exchange liquid to circulate as it is heated by the direct source of heat.

4. A low temperature separation system for high pressure hydrocarbon well streams including;

a high pressure vessel receiving the well stream;

a choke through which the well stream is received into the high pressure vessel and reduced in pressure to condense the preponderant part of the hydrocarbons and dehydrate the gaseous portion of the well stream;

a liquid bath in the high pressure vessel arranged to receive hydrates directly therein as the hydrates are formed when the pressure of the well stream is reduced;

an outlet for the dehydrated gas above the level of the liquid bath;

and a source of heat mounted in the vessel and arranged in the liquid bath to maintain the bath at a temperature which will melt the hydrates received therein, and the source also extending substantially through the length of the gas flow path to the outlet so as to prevent hydrates from forming an obstruction to the gas flow at the outlet comprising, a direct source of heat operated at low pressure, and a chamber of heat exchange liquid about the low pressure source of heat and in heat exchange contact with the liquid bath and with the gas flowing to the outlet;

a conduit connected to the chamber of heat exchange liquid at two points to provide a circuit for the heat exchange liquid to circulate as it is heated by the source of heat;

and a jacket about the choke and communicating with the conduit to pass the heat exchange liquid externally about the choke and in heat exchange with the choke.

5. A low temperature separation system for high pressure hydrocarbon well streams including, a high pressure vessel which is generally elongated in the vertical direction and receiving the well stream, a choke through which the well stream is received into the high pressure vessel and reduced in pressure to condense the preponderant part of the hydrocarbons and dehydrate the gaseous portion of the well stream, a liquid bath in the lower portion of the high pressure vessel arranged to receive hydrates directly therein as the hydrates are formed when the pressure of the well stream is reduced, an outlet for the dehydrated gas above the level of the liquid bath, and a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet.

6. A low temperature separation system for high pressure hydrocarbon well streams including;

a high pressure vessel which is generally elongated in the vertical direction and receiving the well stream;

a choke through which the well stream is received into the high pressure vessel and reduced in pressure to condense the preponderant part of the hydrocarbons and dehydrate the gaseous portion of the well stream;

a liquid bath in the lower portion of the high pressure vessel arranged to receive hydrates directly therein as the hydrates are formed when the pressure of the well stream is reduced;

an outlet for the dehydrated gas above the level of the liquid bath;

and a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a direct source of heat operated at low pressure and in elongated form along the axis of the vessel;

and a chamber of heat exchange liquid about the direct source of heat and between the direct source of heat and the liquid bath and between the direct source of heat and high pressure gas space of the vessel.

7. A low temperature separation system for high pressure hydrocarbon well streams including;

a high pressure vessel which is generally elongated in the vertical direction and receiving the well stream;

a choke through which the well stream is received into the high pressure vessel and reduced in pressure to condense the preponderant part of the hydrocarbons and dehydrate the gaseous portion of the well stream;

a liquid bath in the lower portion of the high pressure vessel arranged to receive hydrates directly therein as the hydrates are formed when the pressure of the well stream is reduced;

an outlet for the dehydrated gas above the level of the liquid bath;

a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a direct source of heat operated at low pressure and in elongated form along the axis of the vessel, and a chamber of heat exchange liquid about the direct source of heat and between the direct source of heat and the liquid bath and between the direct source of heat and high pressure gas space of the vessel;

and a conduit connected to the chamber of heat exchange liquid at a high point and a low point and extending external of the vessel to provide a circuit for the heat exchange liquid to circulate as it is heated by the source of heat.

8. A low temperature separation system for high pressure hydrocarbon well streams including;

a high pressure vessel which is generally elongated in the vertical direction and receiving the well stream;

a choke through which the well stream is received into the high pressure vessel and reduced in pressure to condense the preponderant part of the hydrocarbons and dehydrate the gaseous portion of the well stream;

a liquid bath in the lower portion of the high pressure vessel arranged to receive hydrates directly therein as the hydrates are formed when the pressure of the well stream is reduced;

an outlet for the dehydrated gas above the level of the liquid bath;

a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a direct source of heat operated at low pressure and in elongated form along the axis of the vessel, and a chamber of heat exchange liquid about the direct source of heat and between the direct source of heat and the liquid bath and between the direct source of heat and high pressure gas space of the vessel;

a conduit connected to the chamber of heat exchange liquid at a high point and a low point and extending external of the vessel to provide a circuit for the heat exchange liquid to circulate as it is heated by the source of heat;

and a jacket about the choke and communicating with the conduit to pass the heat exchange liquid externally about the choke and in heat exchange with the choke.

9. A low temperature separation system for high pressure hydrocarbon well streams including;

a high pressure vessel which is generally elongated in the vertical direction and receiving the well stream;

a choke through which the well stream is received into the high pressure vessel and reduced in pressure to condense the preponderant part of the hydrocarbons and dehydrate the gaseous portion of the well stream;

a liquid bath in the lower portion of the high pressure vessel arranged to receive hydrates directly therein as the hydrates are formed when the pressure of the well stream is reduced;

an outlet for the dehydrated gas above the level of the liquid bath;

a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a direct source of heat operated at low pressure and in elongated form along the axis of the vessel, and a chamber of heat exchange about the direct source of heat and between the direct source of heat and the liquid bath and between the direct source of heat and the high pressure gas space of the vessel;

and a plurality of fins extending from the chamber of heat exchange liquid into the bath, whereby the heat from the source which passes through the heat exchange liquid is dissipated into the bath by conduction with the fins at the plurality of contact points with the fins.

10. A low temperature separation system for high pressure hydrocarbon well streams including;

a high pressure vessel which is generally elongated in the vertical direction and receiving the well stream, a choke through which the well stream is received into the high pressure vessel and reduced in pressure to condense the preponderant part of the hydrocarbons and dehydrate the gaseous portion of the well stream;

a liquid bath in the lower portion of the high pressure vessel arranged to receive hydrates directly therein as the hydrates are formed when the pressure of the well stream is reduced;

an outlet for the dehydrated gas above the level of the liquid bath;

a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a direct source of heat operated at low pressure and in elongated form along the axis of the vessel, and a chamber of heat exchange liquid about the direct source of heat and between the direct source of heat and the liquid bath and between the direct source of heat and high pressure gas space of the vessel;

and a vertical circular baffle mounted about the source of heat and at the level of the choke to deflect the well stream of reduced pressure downward toward the surface of the bath while insulating the cooled well stream from the heat of the chamber of heat exchange liquid and to then deflect the gaseous portion of the well stream upward toward the outlet for the stripped and dehydrated gas and into heat exchange with the chamber of heat exchange liquid.

11. A low temperature separation system for high pressure hydrocarbon well streams including, a high pressure vessel which is generally elongated in the vertical direction and receiving the well stream, a choke through which the well stream is received into the high pressure vessel and reduced in pressure to condense the preponderant part of the hydrocarbons and dehydrate the gaseous portion of the well stream, a liquid bath in the lower portion of the high pressure vessel arranged to receive hydrates directly therein as the hydrates are formed when the pressure of the well stream is reduced, an outlet for the dehydrated gas above the level of the liquid bath, a source of heat which is generally elongated in the vertical direction and mounted in the vessel so as to be partially emersed in the liquid bath, and the source also extending through a substantial length of the gas flow path to the outlet so as to prevent hydrates from forming an obstruction to the gas flow at the outlet comprising, a firetube heated with fluid fuel at substantially atmospheric conditions and extended axially through the vessel, and a jacket about the firetube for heat exchange liquid between the firetube and the liquid bath and between the firetube and high pressure gas space of the vessel.

References Cited in the file of this patent

UNITED STATES PATENTS

| | | |
|---|---|---|
| 2,354,932 | Walker et al. | Aug. 1, 1944 |
| 2,738,026 | Glasgow et al. | Mar. 13, 1956 |